March 22, 1938.　　　J. A. PARKS, JR　　　2,112,211
AIR VENTING VALVE
Filed Oct. 18, 1935
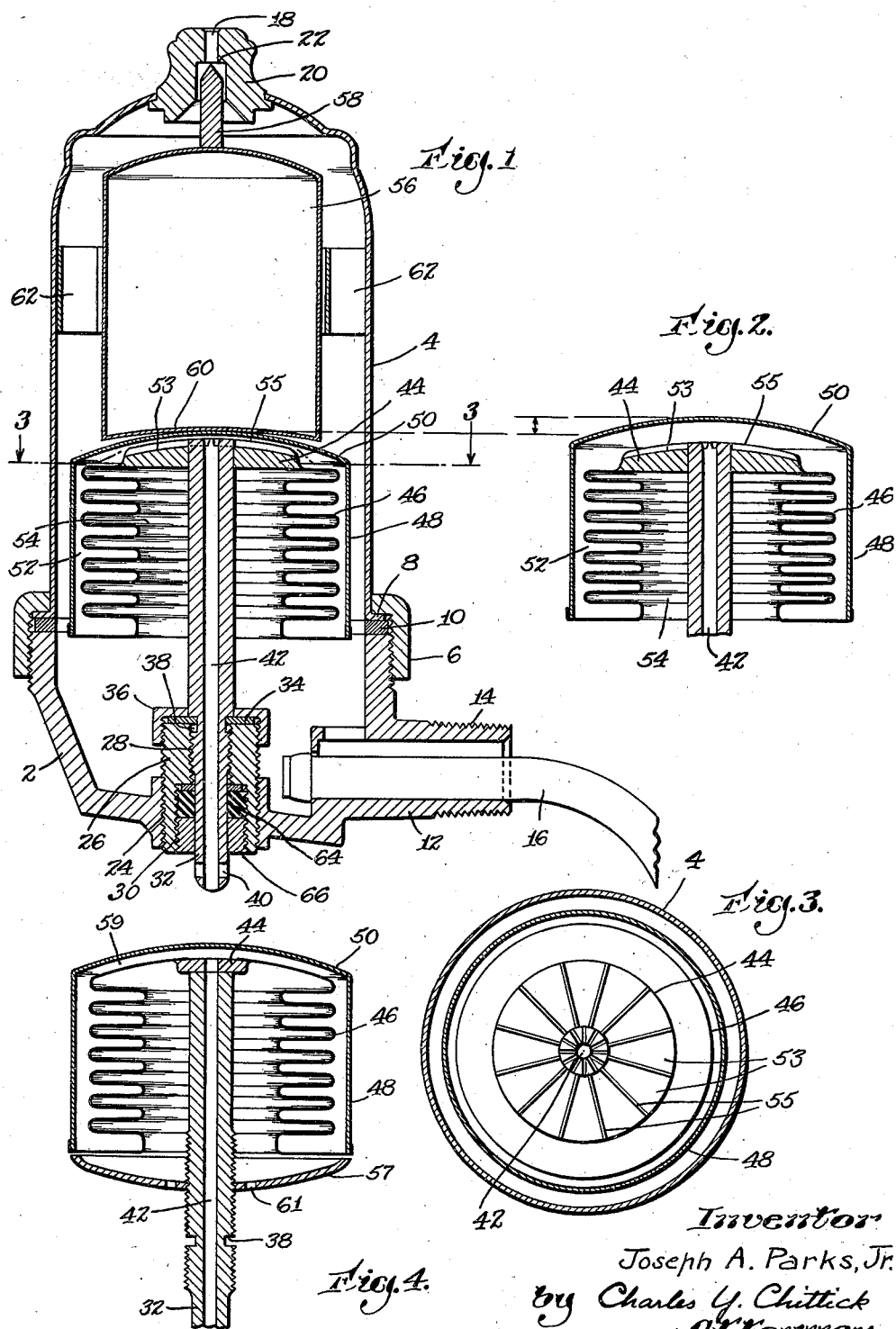
Inventor
Joseph A. Parks, Jr.
by Charles Y. Chittick
Attorney Patented Mar. 22, 1938

2,112,211

UNITED STATES PATENT OFFICE 2,112,211

AIR VENTING VALVE

Joseph A. Parks, Jr., Milton, Mass., assignor, by mesne assignments, to Anderson Products, Incorporated, a corporation of Massachusetts Application October 18, 1935, Serial No. 45,624

11 Claims. (Cl. 236—61)

This invention pertains to steam heating systems. More particularly it is concerned with air venting valves that are commonly used in connection with such systems.

In a steam heating system it is necessary to provide means whereby the air in the system can be expelled as steam is generated in the boiler. Such means is usually provided in the form of an automatic valve positioned on the radiators. These valve are so constructed that, after the air has been driven out, they will automatically close after the steam has filled the radiator and reached the valve.

In the more advanced type of valve, means is also provided for maintaining the valve in closed position after the steam supply has ceased and the temperature at the valve and the pressure within the system has dropped. In this way a negative pressure may be created within the system which permits the formation of low temperature, low pressure steam, thereby supplying heat to the radiators for a longer portion of each heating cycle.

In the valves which close or remain closed when the pressure within the system is less than atmospheric pressure, the motivating force is usually the pressure differential between the atmosphere and that within the system. Since this pressure differential is never very large, and most of the time is quite small, it is extremely desirable to have a valve-closing mechanism that is very sensitive and will operate effectively on small pressure differences.

Heretofore different devices capable of operation by pressure differences have been used, the most common being the simple diaphragm as exemplified by the patent to Hoffman, No. 1,708,622.

Due to lack of sensitivity of the diaphragm type it has been largely superseded by the more sensitive bellows, but even the latter type while sufficiently sensitive to give a commercially practical device, still does not close at pressure differences as low as is desired by the trade in which these devices are used.

It is a peculiarity of the type of bellows commonly used in air venting valves that they compress more readily than they elongate. That is to say, it takes less force to compress a given bellows one-eighth of an inch than it does to elongate it one-eighth of an inch. By my invention I have succeeded in utilizing this special characteristic of a bellows to produce an air venting valve that will close on a smaller pressure difference than any other valve of which I am aware.

As the description of my valve proceeds with the aid of the accompanying drawing, other objects and accomplishments of my invention will become apparent.

In the drawing:

Fig. 1 is a vertical cross section of an air valve incorporating my improved construction.

Fig. 2 is a cross section of the bellows unit shown in Fig. 1 after the bellows has been compressed by pressure differences.

Fig. 3 is a section on the line 3—3 of Fig. 1.

Fig. 4 is a cross-section of a modified form of bellows unit.

The valve is composed of a base 2 having a casing or shell 4 mounted thereon. The casing, which is demountable, is secured to the base by means of the lock nut 6 which engages an outturned flange 8 forcing the latter against the lead washer 10, thereby making an air and steam tight joint.

Extending from the lower part of the base is a nipple 12 through which air or steam may enter the valve. The nipple is threaded at 14 for screw-threaded engagement with a radiator or other heat exchanger. Customarily positioned within the nipple 12 is a siphon tube 16 which assists in returning the condensate from the valve to the radiator.

At the top of the casing 4 is a vent 18 leading to the atmosphere. This vent may be formed either directly in the casing 4 or in a separate member 20 which may thereafter be secured in the casing in any well known manner, as for example, by soldering or by a driving fit as shown.

Within the venting member 20 is a valve seat 22 adapted to receive a valve pin of any suitable configuration that will effectively close the vent 18.

A threaded centrally-located bore, as at 24, is present in the base. Threaded within the bore 24 is a sleeve 26 also threaded internally, as at 28 and as at 30, the latter portion being of somewhat larger internal diameter. Threaded into bore 28 is a stem 32 which is adapted for vertical adjustment with relation to the base 2, the shell 4 and the valve seat 22. A split washer 34 is mounted on the upper end of sleeve 26, being held in position by a cap 36. The washer 34 fits in a short groove 38 in the stem 32. It is obvious from this construction that the vertical movement of stem 32, both upwardly and downwardly, is limited by the length of groove 38. The purpose of limiting the movement of stem 32 with relation to sleeve 26 and the base 2 will be explained more fully hereinafter. A hole 40 through which a pin may be inserted is provided to facilitate rotation of stem 32.

Extending longitudinally of stem 32 is the air passage 42 open at all times to the atmosphere. Mounted on the upper end of stem 32 is a bellows unit consisting of a disc-like or circular member 44 which acts as a supporting means for a depending bellows 46 attached thereto. Surrounding the bellows and connected thereto at its lower edge throughout its entire circumference is a cylindrical shell 48 which in turn is sealed at its upper edge by a convex top member 50, the shell 48 and top member 50 forming an inverted cup-like portion. From the foregoing construction it can be seen that the atmosphere can enter through air passage 42 of stem 32 to reach the space 52 which is between the bellows 46 on the inside and the shell 48 on the outside. When the bellows is at its normal length, that is, the length it assumes when the pressure on both sides of the bellows is the same, the top 50 is positioned to just rest on the upper end of stem 32. In order that the atmosphere may freely enter the bellows unit, it is desirable to provide ducts or slots on the top portion of member 44 as at 53, the top 50 of bellows unit resting on the raised portions 55 as shown in Fig. 1. By this construction it is believed clear that the bellows 46 will be compressed to raise top member 50 when the pressure in space 52 exceeds the pressure within the valve as at 54. It is this operation of the bellows that is relied upon to close the valve when the atmospheric pressure exceeds the internal valve pressure.

Resting upon the top 50 is a thermostatic float 56 of the usual type on the top of which is mounted a valve pin 58, the upper end of the latter being adapted for closing engagement with valve seat 22. The thermostatic float 56 is constructed so that the concave bottom 60 will snap downwardly at a predetermined temperature, thereby driving valve pin 58 upwardly against valve seat 22. Since the thermostatic float 56 is a hollow sealed member light enough to float, it also acts to close vent 18 should water fill the valve. If necessary, guide 62 may be inserted within shell 4 to direct the movement of float 56.

Referring now to the adjusting mechanism described above, the valve is adjusted for operation in the following manner. Stem 32 is screwed upwardly with relation to sleeve 26 until the lower edge of groove 38 engages the under side of washer 34. Sleeve 26 is then screwed upwardly with relation to base 2 carrying with it stem 32, bellows 46 and float 56 until valve pin 58 is properly seated against valve seat 22. At this point sleeve 26 is secured to base 2 to prevent further rotation. Stem 32 is then screwed downwardly until the upper edge of groove 38 encounters the upper side of washer 34. The length of groove 38 is made such that when the stem 32 reaches this position, the valve pin 58 will be withdrawn from the valve seat 22 an amount to give the maximum rate of venting. At the same time the distance valve pin 58 must travel to close vent 18 will not exceed the downward movement of bottom 60 of the thermostatic float 56 nor the upward movement of top 50 when actuated by the collapse of the bellows 46 under the influence of pressure differentials.

The position of the parts in Fig. 1 shows my valve at its maximum venting capacity, but it is obvious that the venting rate may be reduced by rotating stem 32 to move the bellows, float and valve pin 58 upwardly, thereby causing the opening between valve pin 58 and valve seat 22 to become less.

Positioned within bore 30 of the sleeve 26 and surrounding stem 32 is the usual packing 64 secured in place by the nut 66 to prevent leakage of steam or air.

It should be pointed out at this time that the bellows 46 when in the position shown in Fig. 1 is neither under tension nor compression. However, since top 50 just grazes the upper end of stem 32, or the member 44 mounted thereon, elongation of the bellows is prevented, but on the other hand, no stop of any kind is provided in the bellows mechanism to prevent collapse of the bellows as is evident from an inspection of Fig. 2. Seating of the valve pin 58 on valve seat 22 is the only means provided to limit collapse of bellows 46. An alternative form of bellows unit is shown in Fig. 3. Instead of having the top 50 engage the member 44 to prevent elongation of the bellows under forces acting downwardly on top 50, it has been found desirable in certain instances to support top 50, and shell 48 against downward movement by means of a support preferably in the form of a dished disc 57 secured to the stem 32 in any suitable manner, one method being screw threaded engagement as shown.

In making this assembly, the stem 32, bellows 46, shell 48 and top 50 are assembled in the usual manner, there being, however, a space 59 between the top 50 and member 44 when the bellows is in normal position, that is, when the pressure on both sides of the bellows is the same. Thereafter, disc 57 is screwed upwardly on stem 32 until the disc just engages the bottom of shell 48 and the bellows 46. This construction provides an easy method of setting the bellows at its normal length and at the same time preventing elongation thereof.

The operation of my valve is as follows:—With the valve set to give any desired rate of venting, steam is generated in the boiler connected with the system. The steam advances to the radiator on which my valve is positioned, the air in the system being driven ahead and passing through the radiator into the valve and out through vent 18. Subsequently steam fills the radiator and flows into the valve. Upon reaching the thermostatic float 56 the temperature of the steam is sufficiently great to cause expansion of the gases within the float 56, thereby causing the concave bottom 60 to snap downwardly to a convex position, thus driving valve pin 58 upwardly to seat against valve seat 22, thereby preventing escape of steam from the valve. Thereafter, upon cessation of steam generation, the temperature of the radiator falls, causing the steam within the system to collapse, forming a condensate. The collapse of the steam usually results in the creation of a negative pressure within the system, extending, of course, to the valve. As the negative pressure develops faster than the temperature falls, the bottom 60 of thermostatic float 56 will remain in its convex position for some time after a negative pressure within the valve has developed, keeping vent 18 closed. With a negative pressure within the valve the tendency is for the top 50 of the bellows structure to move upwardly assisting in maintaining vent 18 closed. Eventually, however, the temperature within the thermostatic float 56 recedes to a point where the bottom 60 snaps back to the position shown in Fig. 1. However, due to the pressure difference between the atmosphere and the interior of the valve, bellows 46 is instantly compressed raising top 50 and float 56 to a position where valve stem 58 is again engaged with valve seat 22. As a matter of fact, in practice, as fast as the bottom 60 collapses from the convex to concave position, bellows 46 collapses driving top 50 upwardly so that the vent is not re-opened in this transition period.

Thereafter, as long as the pressure within the system is less than the atmospheric pressure, the vent 18 is kept closed preventing air from re-entering the system through the valve.

One of the most important results of my construction is to permit the utilization of one of the inherent characteristics of a bellows of the type commonly used in valve constructions, namely, the characteristic that such bellows are more sensitive to compression than elongation. By my arrangement the valve may be maintained in closed position under smaller differences in pressure than has been possible where elongation of the bellows was relied upon. In addition my construction lends itself to hard usage as the bellows is within the shell 48 thereby protected from damage should the valve be taken apart for cleaning or other adjustments.

It must be remembered, however, that the foregoing description of my valve is only illustrative and I do not wish to be limited to the exact construction heretofore set forth, but only as defined in the appended claims.

I claim:—

1. In a radiator air venting valve, a base and a casing having a vent, means mounted on the base for closing said vent comprising a float carrying a valve pin, a bellows supporting said float and adjustably mounted on the base, means for permitting atmospheric pressure to reach the outside of said bellows at all times and means to prevent elongation beyond its normal length.

2. In a radiator air venting valve, in combination, a vent and vent-closing means comprising an axially adjustable bellows for varying the normal vent opening, means to expose said bellows to the atmosphere on one side, and stop means which permits compression of said bellows but prevents expansion of said bellows beyond its normal length.

3. In a steam radiator air venting valve a casing with a vent, means for closing said vent under the influence of heat or water or pressure, means for varying the effective venting area comprising a screw threaded member with a groove therein, a stop in the form of a washer mounted on said casing surrounding said member and positioned in said groove to limit the upward and downward movement of said member, the range of movement being within the operative capacity of said vent closing means.

4. In a radiator air venting valve a casing with a vent, vent closing means comprising a float and a bellows, means for adjusting the normal effective area of said vent comprising a sleeve adjustable with respect to said vent, a supporting member carrying said vent closing means within said sleeve adjustable with respect to said sleeve and said vent, and means for limiting the movement of said supporting member with respect to said sleeve.

5. In a radiator air venting valve a casing with a vent, vent closing means, means for adjusting the normal effective area of said vent comprising a sleeve adjustable with respect to said vent, a supporting member disassociated from said casing within said sleeve adjustable with respect to said sleeve and said vent, and means for limiting the movement of said supporting member with respect to said sleeve.

6. In a radiator air venting valve a casing with a vent, vent closing means, means for adjusting the normal effective area of said vent comprising a sleeve adjustable with respect to said vent, a supporting member within said sleeve adjustable with respect to said sleeve and said vent, said sleeve and supporting member capable of being rotated as a unit with respect to said casing.

7. In a radiator air venting valve, in combination, a vent and vent closing means comprising a bellows, means to expose said bellows to the atmosphere on one side, and stop means which permits compression of said bellows but prevents expansion of said bellows beyond its normal length.

8. A radiator air venting valve comprising a casing with a vent fixed therein, adjustable vent closing means including a compressible bellows provided with stop means to prevent elongation beyond its normal length, and means whereby the interior of said bellows is exposed to the internal valve pressure.

9. In a radiator air venting valve, the combination of a casing having a vent, a stem mounted in the base of said casing and adjustable relative thereto, a bellows mounted on said stem, an air passage through said stem, means including said stem whereby atmospheric pressure may be effective against the exterior of said bellows, and means supported by said bellows capable of closing said vent.

10. A radiator air venting valve comprising a casing with a vent therein and means for closing said vent comprising a valve pin mounted on a float, said float supported by a bellows adjustably mounted in said casing, means whereby said bellows is exposed to the atmospheric pressure exteriorly and the internal valve pressure interiorly, and stop means to prevent material elongation of said bellows.

11. In a radiator air venting valve, vent closing means and vent varying means comprising a threaded sleeve, a stop mounted on said sleeve and adjustably fixed with respect to said vent, a member threaded within said sleeve for adjusting said vent closing means and movable toward and away from said vent, said member having a groove, the end walls of which engage said stop when moved in either direction, the range of movement of said member maintaining said vent closing means within operative limits.

JOSEPH A. PARKS, Jr.